Nov. 14, 1933.  B. B. HART  1,934,921
POULTRY SINEW PULLER
Filed March 17, 1931
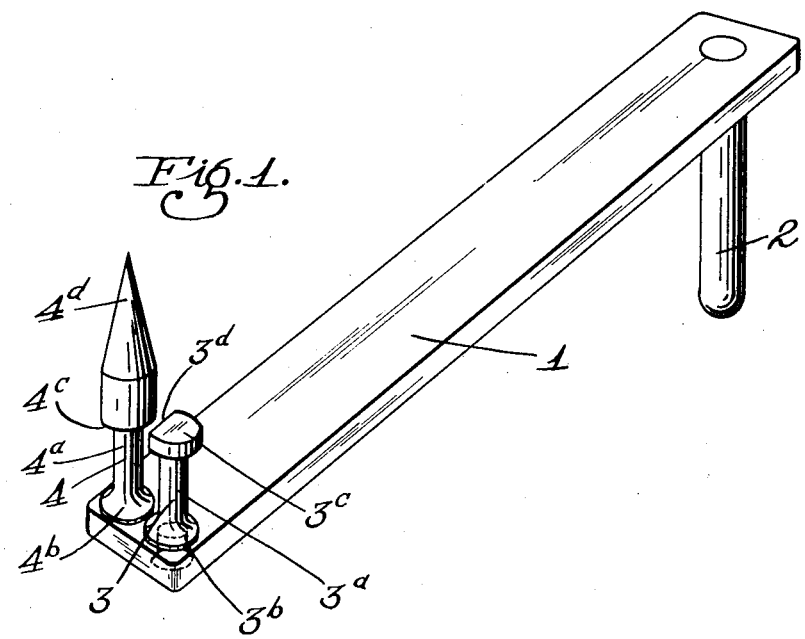
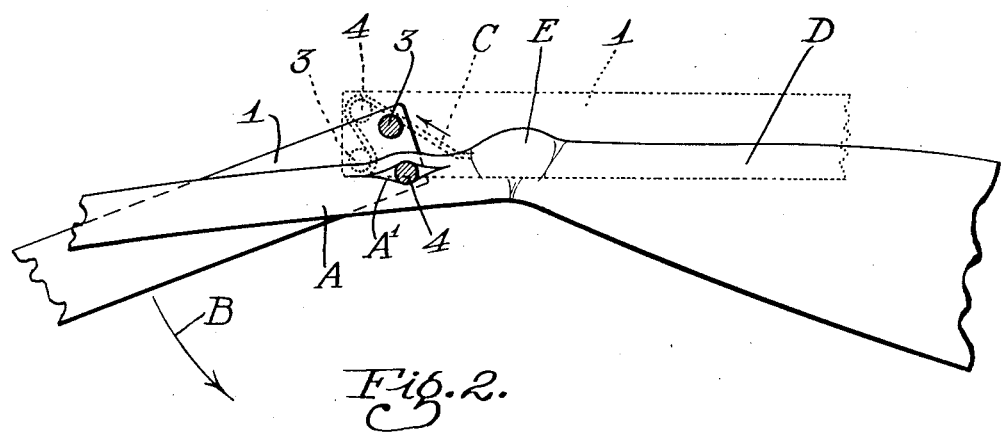
INVENTOR
BURNETT B. HART
BY A. B. Bowman
ATTORNEY Patented Nov. 14, 1933

1,934,921

UNITED STATES PATENT OFFICE 1,934,921

POULTRY SINEW PULLER

Burnett B. Hart, Long Beach, Calif.

Application March 17, 1931. Serial No. 523,256

5 Claims. (Cl. 17—11)

My present invention relates to a device or means for extracting or pulling the sinews or tendons from the legs of poultry, or from other meats.

The objects of this invention are: first, to provide a very simple, economical and durable device for extracting, pulling or withdrawing the sinews or tendons from the legs of poultry and the like; second, to provide a device of this class which may be easily manipulated and whereby the sinews or tendons may be easily and quickly removed or extracted, and whereby the sinews or tendons are not easily broken in the attempt to extract or withdraw the same; third, to provide a device of this class whereby the sinews or tendons are extracted or withdrawn by a simple prying operation and a device whereby one end of the sinews or tendons, not desired, or intended to be extracted, or torn loose, is held firmly by the device while extracting force is applied to the other portions of the sinews or tendons; fourth, to provide a device of this class that will not slip off the legs of the poultry and one from which the sinews or tendons will not slip off; and, fifth, to provide a device of this class which will not readily deteriorate or get out of order.

With these and other objects in view as will appear hereinafter, I have devised a device of this class having certain novel features of construction, combination and arrangement of parts and portions, as will be hereinafter described in detail and particularly set forth in the appended claims, reference being had to the accompanying drawing and to the characters of reference thereon which form a part of this application in which:

Figure 1 is a perspective view of my sinew or tendon puller in one form; and Fig. 2 is a fragmentary side view of the leg of a fowl showing my device by solid lines in position for extracting or withdrawing the sinews or tendons from the upper sections of the leg, and showing by dotted lines my device in a shifted position with the sinews or tendons partly extracted.

Like characters of reference refer to similar parts and portions throughout the views of the drawing.

My device as shown in the drawing consists of a flat metal bar 1, a handle 2, and prongs 3 and 4. The flat metal bar 1 is of such length as to give sufficient leverage for prying or pulling the sinews or tendons loose. The handle 2 is riveted, or otherwise secured, to the bar 1 at one end and in the center thereof, and extends outwardly therefrom at substantially right angles to the plane of the bar 1. The prongs 3 and 4 are positioned at the opposite end and on the opposite side of the bar from that to which the handle 2 is secured, and are preferably parallel to each other and at right angles to the longitudinal extent of the bar 1, and may be positioned at or adjacent the opposite edges of the bar, as shown. These prongs are provided with central rounded portions $3a$ and $4a$, respectively, and flanges $3b$ and $4b$, respectively, formed as a part of the rounded portions $3a$ and $4a$, the flanges being positioned at the ends of the rounded portions adjacent the bar 1. Extending beyond the flanges $3b$ and $4b$ are portions which extend through the bar 1 and are riveted at the opposite side of the bar for securing the prongs thereto. Positioned at the extended end of the prong 3 is a cap $3c$ which, in this instance, is formed as a part of the central portion $3a$. This cap is provided with a flat side $3d$ on the side adjacent the prong 4 for providing clearance between the prong 3 and the prong 4. The extended end of the portion $4a$ of the prong 4 is provided with an enlarged portion of substantially the same diameter as the cap on the prong 3, which enlarged portion provides a shoulder $4c$ similar to the shoulder on the prong 3 provided by the cap $3c$. The purpose of these shoulders formed on the prongs is for preventing the device from slipping off the legs of the poultry, or the sinews or tendons from slipping off the device when using the same. The enlarged portion of the prong 4 extends considerably above the prong 3, making the prong 4 of greater length than the prong 3, and is provided at its outer end with a pointed portion $4d$, the point being adapted to facilitate the insertion of the prong 4 into the legs of the poultry.

The device is used in the following manner:

The lower section, designated A, of the leg of the fowl is slit longitudinally at the posterior portion between the bone and the sinews, the incision being of sufficient length to permit the ready introduction of the pointed prong, the slit or incision being designated by $A^1$ in Fig. 2. When the pointed prong is inserted, the other prong 3 is clear of the leg. The device is then pivoted or shifted in the direction of the arrow, designated B, until the prong 3 engages the outer side of the posterior portion of the lower section of the leg. Further shifting of the handle in the direction of the arrow B forces the prong against the leg and clamps the lower ends of the sinews or tendons, designated C, against the bone. The prong 3 then serves as a pivot about which the handle and the prong 4 are shifted, drawing the sinews or tendons outwardly and downwardly with respect to the foot end of the leg. Continuous shifting of the handle in the direction of the arrow B causes the sinews to be wound up on the prongs and thus extracted from the upper sections D of the leg. With the sinews thus withdrawn, the lower portion or section A of the leg may be severed at the joint E.

Though I have shown and described a particular construction, combination and arrangement of parts and portions of my device, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A poultry sinew puller of the class described, consisting of a handle having at one end a pair of spaced-apart prongs, the one being longer than the other and pointed at its end.

2. In a device of the class described, a handle having at one end a pair of spaced-apart prongs said prongs having means in connection therewith for retaining on the prongs the substance wound thereon, the one prong being longer than the other and pointed at its end.

3. A poultry sinew puller of the class described, including a handle in the form of a crank having at one end a pair of spaced-apart prongs, the one being longer than the other and pointed at its end, each of the prongs being reduced in diameter inwardly from their outer ends.

4. In a poultry sinew puller of the class described, a handle in crank form, and a pair of pins secured at one end to the flat side of one end of the handle and positioned substantially at right angles thereto, each of the pins having enlarged portions adjacent their extended ends.

5. In a device of the class described, a handle, and a pair of pins secured at one end to the flat side of one end of the handle and positioned substantially at right angles thereto, each of the pins having enlarged portions adjacent their extended ends, one of the enlarged portions being extended outwardly a considerable distance beyond the end of the other pin and pointed at its end.

BURNETT B. HART.